US011451085B2

(12) United States Patent
Reddy et al.

(10) Patent No.: US 11,451,085 B2
(45) Date of Patent: Sep. 20, 2022

(54) FUEL CELL AND BATTERY BACKUP POWER SOURCES WITHIN POWER SYSTEMS

(71) Applicant: Caterpillar Inc., Peoria, IL (US)

(72) Inventors: Suresh Baddam Reddy, Peoria, IL (US); David Michael Milam, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 87 days.

(21) Appl. No.: 17/007,978

(22) Filed: Aug. 31, 2020

(65) Prior Publication Data

US 2022/0069613 A1 Mar. 3, 2022

(51) Int. Cl.
*H02J 9/06* (2006.01)
*H02J 7/34* (2006.01)
*H02J 7/00* (2006.01)

(52) U.S. Cl.
CPC ............ *H02J 9/061* (2013.01); *H02J 7/0068* (2013.01); *H02J 7/34* (2013.01); *H02J 9/068* (2020.01)

(58) Field of Classification Search
CPC .......... H02J 9/061; H02J 9/068; H02J 7/0068; H02J 7/34
See application file for complete search history.

(56) References Cited

U.S. PATENT DOCUMENTS

| 6,923,168 | B2 | 8/2005 | Bryde |
| 7,117,044 | B2 | 10/2006 | Kocher et al. |
| 7,244,524 | B2 * | 7/2007 | McCluskey ......... H01M 16/003 429/9 |
| 7,280,377 | B2 | 10/2007 | Johnson |
| 8,686,592 | B2 | 4/2014 | Fontana et al. |
| 8,970,176 | B2 | 3/2015 | Ballatine et al. |
| 9,093,862 | B2 | 7/2015 | Dennis et al. |
| 10,263,456 | B1 * | 4/2019 | Wang ................. H02M 3/33584 |
| 2004/0053093 | A1 * | 3/2004 | Colborn ............. H01M 8/0491 429/430 |
| 2004/0125618 | A1 | 7/2004 | De Rooij et al. |
| 2012/0025616 | A1 * | 2/2012 | Hock ...................... H02J 9/061 307/66 |
| 2013/0002027 | A1 | 1/2013 | Yu et al. |

\* cited by examiner

*Primary Examiner* — Jared Fureman
*Assistant Examiner* — Duc M Pham
(74) *Attorney, Agent, or Firm* — Lee & Hayes, PLLC

(57) ABSTRACT

An uninterruptible power supply (UPS) system or other power system includes a primary power source and a fuel cell and battery system as a backup power source. The fuel cell and battery backup system(s) are integrated into the primary power source to reduce the required power components and to provide high-quality power conditioning for the UPS system. A control system receives and analyzes data from the primary power source, as well as from the fuel cell and battery backup systems, to perform advanced power management and sharing, manage transitions, export power to the grid, and manage boil-off losses at the fuel cell.

20 Claims, 5 Drawing Sheets

FUEL CELL AND BATTERY BACKUP POWER SOURCES WITHIN POWER SYSTEMS

TECHNICAL FIELD

This disclosure relates generally to uninterruptible power supply (UPS) systems and other backup power systems used by power-sensitive applications. More specifically, this disclosure describes UPSs and backup power systems that include fuel cells, battery systems, and power management control systems configured to provide UPS functionality, power sharing, and high-quality power conditioning.

BACKGROUND

UPS systems and other backup power systems are used to provide power protection for critical and power-sensitive environments in the event of a power loss at a primary power source. Environments such as hospitals, data centers, mining sites, and critical information technology (IT) applications use UPSs to provide protect computers and other equipment safe and functional during power outages and significant losses. UPS systems often include generator sets and/or other battery backup systems that are configured to detect power losses from a primary power source, such as the public electrical grid, and in response automatically provide high-quality backup power to allow the computers and other equipment within the environment to continue operating uninterrupted. However, in such systems batteries alone are insufficient to provide the backup power that is generally required for outages that are several hours (e.g., 48 hours), making the cost and footprint of batteries prohibitive to substitute or avoid in generator sets as backup.

Fuel cells that use hydrogen and oxygen, or other chemical combinations, to generate electricity via electrochemical reactions provide significant advantages as power sources over conventional diesel or gas generator sets. For example, fuel cells provide a clean energy source with a smaller carbon footprint. Fuel cells are also longer-lasting, quieter, and more reliable as a backup energy source, as compared with comparable generator sets. Additionally, unlike batteries, fuel cells will function as backup power sources for longer periods of time (e.g., 24 to 48) as required. However, if fuel cells are used as backup power, replacing gensets, additional power electronics are required to covert the DC input from the fuel cell to AC power, along with a transfer switch to bypass power. On the other hand, many fuel cells have characteristics that make them impractical for use directly within UPS systems, as replacement to battery systems. For example, once a fuel cell system is activated the power output of the fuel cell often takes several minutes to ramp up before it can provide sufficient power to take over as primary power source. During that ramp-up period, a separate battery or other energy storage system is used to provide power as part of the UPS system. Additionally, if the fuel cell is expected to function as secondary power in addition to grid power for peak shaving, as well as providing export of active and reactive power to the grid, the backup power within a conventional UPS would require additional power converters that are redundant of the power electronics needed within the UPS system. Integration of fuel cell systems as both backup power as well as secondary power with conventional architectures would require excessive and redundant power electronics, resulting in additional costs and negative footprint implications.

For example, U.S. Pat. No. 7,244,524 ("the '524 patent") describes a power system including a primary power source and a fuel cell used as a secondary power source. The system described in the '524 patent includes a control method for transitioning from the primary power source to the fuel cell. The '524 patent also describes using the fuel cell to supplement the primary power source when the load exceeds the capabilities of the primary power source. However, the system described in the '524 patent does not perform any power conditioning techniques and thus would be unsuitable for use in high-quality UPS systems. Further, the '524 patent does not describe any power management techniques for the fuel cell (e.g., boil-off), power factor conversion, or any supervised control of the transition processes, power sharing, and power exporting back to the public grid. Accordingly, the system described in the '524 also fails to leverage the potential advantages of fuel cells systems within UPS environments.

Example embodiments of the present disclosure are directed toward overcoming the deficiencies described above.

SUMMARY

In an example of the present disclosure, a power system includes a primary power source arranged to provide voltage to a target load via a DC bus, the DC bus being electrically connected to the target load, and being electrically connected to the primary power source via a first connection. The power system further includes a first backup power source including an electrochemical fuel cell, wherein the first backup power source is arranged to provide voltage from the electrochemical fuel cell to the target load via the DC bus, the DC bus being electrically connected to the first backup power source via a second connection. Additionally, the power system includes a second backup power source including an energy storage device, wherein the second backup power source is arranged to provide voltage from the energy storage device to the target load via the DC bus, the DC bus being electrically connected to the second backup power source via a third connection.

In another example of the present disclosure, a method includes receiving, by a control system, a first data signal from a primary power source of a power system, wherein the primary power source is arranged to provide voltage to a target load via a DC bus electrically disposed between the primary power source and the target load. The method further includes receiving, by the control system, a second data signal from a backup power source of the power system, wherein the backup power source comprises an electrochemical fuel cell, wherein the backup power source is separately coupled to the DC bus and is arranged to provide voltage from the electrochemical fuel cell to the target load via the DC bus. Additionally, the method includes determining, by the control system and based at least in part on the first data signal and the second data signal, a first output voltage associated the primary power source, and determining, by the control system and based at least in part on the first data signal and the second data signal, a second output voltage associated with the backup power source. The method further includes transmitting, by the control system, a first control instruction including data representing the first output voltage to a controller of the primary power source via a first data connection, and transmitting, by the control system, a second control instruction including data representing the second output voltage to a controller of the backup power source via a second data connection. Additionally, in such examples, the first control instruction causes the primary power source to output the first output voltage and wherein the second control instruction causes the backup power source to output the second output voltage.

In yet another example of the present disclosure, a UPS system includes a primary power source arranged to provide power to a target load, the primary power source comprising a first controller configured to control a first power output from the primary power source to the target load. The UPS system further includes a first backup power source comprising an electrochemical fuel cell, the first backup power source comprising a second controller configured to control a second power output from the first backup power source to the target load. Additionally, the UPS system includes a second backup power source comprising an energy storage device, the second backup power source comprising a third controller configured to control a third power output from the second backup power source to the target load. Further, the UPS system includes a control system having one or more central processing units (CPUs), and memory storing executable instructions that, when executed by the one or more CPUs, cause the control system to perform various operations. In such examples, the operations performed by the control system include receiving, via one or more data connections, a data signal from at least one of the primary power source, the first backup power source, or the second backup power source. The instructions further include determining, based at least in part on the data signal, an output voltage associated with at least one of the primary power source, the first backup power source, or the second backup power source. Additionally, the instructions include transmitting, via the one or more data connections, a control instruction including data representing the determined output voltage to at least one of the primary power source, the first backup power source, and the second backup power source.

DETAILED DESCRIPTION

Figure 1:
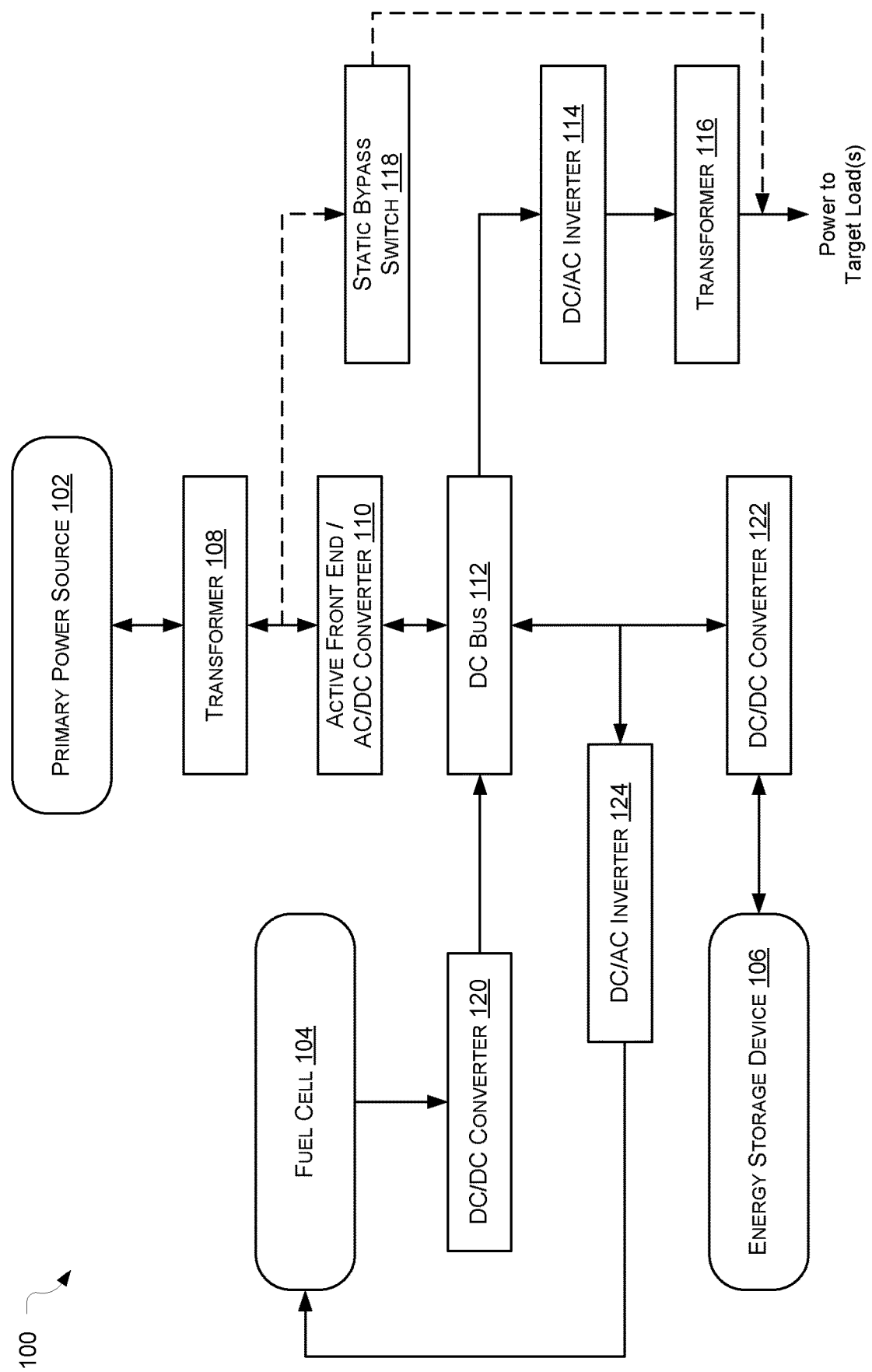
FIG. 1 illustrates an example power system for a UPS, including a primary power source, an integrated fuel cell, and an energy storage device, in accordance with one or more examples of the present disclosure.

FIG. 1 illustrates an example power system 100 of the present disclosure. As described below, the techniques and systems described herein relate to UPS systems and/or other power systems including integrated fuel cells and/or energy storage device backup power sources. In this example, power system 100 includes a primary power source 102, a fuel cell 104 arranged as a backup power source, and an energy storage device 106 arranged as another backup power source. The power system 100 is arranged with various electrical components, described in more detail below, to provide power (e.g., AC voltage) from the primary power source 102, the fuel cell 104, the energy storage device 106, or from a combination of these power sources, to a target load (via an DC/AC inverter with a transformer as needed). In various examples, the target load includes any facility or equipment requiring power to operate. As used herein, a UPS system refers to a power system comprising at least one backup power source configured to provide power to a target load in the event of an electrical power outage or disruption at a primary power source. As noted above, UPS systems are often used to provide power protection for valuable equipment and critical facilities that require continuous and uninterrupted electricity. In various implementations, the power system 100 is configured to provide power to different types of target loads such as hospitals and medical centers, banks, data centers, telecommunications facilities, utilities companies, electronic or production-based manufacturing facilities, broadcasting equipment, and critical information technology (IT) infrastructures. In any of the examples described herein, the power system 100 and/or other power systems of the present disclosure may comprise a UPS system.

Certain techniques and systems described herein include a power system 100 having a compact architecture, and control system 202 that enables a fuel cell 104 to function as backup power during loss of grid, as secondary power to complement the grid, as a UPS power supply with an energy storage device 106 (e.g., battery system, ultracapacitor, etc.), and to provide grid power conditioning, supply conditioned power to the target load and/or the utility grid, manage transitions, and manage sharing of power among the primary power source 102 (e.g., the utility grid), the fuel cell 104, and the energy storage device 106.

During operation of the power system 100, power is provided from the primary power source 102 to an upstream power transformer 108, through an active front end (AFE) and AC/DC converter 110 (or rectifier), to a DC bus 112. In some examples, the primary power source 102 is an electrical grid, such as the electrical grid of a public utility. Power transformer 108 is integrated into the power system 100, and is connected to the primary power source 102 to avoid upstream voltage disturbances and/or electrical pollution from the electrical grid, maintaining a low level of upstream distortion. The power transformer 108 thus provides a consistent and reliable flow of electricity to the AFE and AC/DC converter 110. The AFE and AC/DC converter 110 includes electrical circuitry configured to transform the AC input received from the power transformer 108 into DC output. In some examples, the AFE and AC/DC converter 110 are configured to output a specific DC voltage based on the power requirements of the target load. The AFE and AC/DC converter 110 is configured in some instances to meet grid-tie requirements and/or provide any needed reactive power and power factor corrections for the utility grid of the primary power source 102. The active front end components of the AFE and AC/DC converter 110 monitor and shape the current waveform to be sinusoidal, reducing the harmonic distortion of the power received from the power transformer 108. Additionally, as discussed below, the active front end design of the AFE and AC/DC converter 110 allows power to be exported from the fuel cell 104 back to the primary power source 102 (e.g., electrical grid) for reuse.

Power provided by the primary power source 102 flows from the AFE and AC/DC converter 110 into the DC bus, and then out to the DC/AC inverter 114. The DC/AC inverter 114 includes electrical circuitry configured to transform the DC input received from the DC bus 112 to AC output, which is provided to the downstream power transformer 116. The DC/AC inverter 114 converts DC to AC power to meet the AC voltage needs for the target load, it is also used to maintain power quality of clean AC power with low distortion. The power transformer 116 optionally used in some instances, provides the AC power to the equipment and/or devices of the target load, while isolating those equipment and/or devices from the AC power source for safety reasons. Thus, as power flows from the primary power source 102 to the target load(s), the power system 100 is a voltage and frequency independent (VFI) system, using a dual conversion by the AFE and AC/DC converter 110 and DC/AC inverter 114 to protect against voltage and frequency variations at the primary power source 102.

In this example, the power system includes a static bypass switch 118, allowing the primary power source 102 (e.g., the public utility electrical grid) to feed power directly to the target load(s). In some cases, the static bypass switch 118 is engaged automatically in response to a failure in the AFE and AC/DC converter 110 and/or the DC/AC inverter 114. Additionally or alternatively, the static bypass switch 118 is engaged during normal operation and without any failures in the power electronics of the power system, for instance, when the power system 100 detects that the voltage and frequency of the primary power source 102 are sufficiently stable. When the static bypass switch 118 is engaged, the dual conversion of the AFE and AC/DC converter 110 and DC/AC inverter 114 are bypassed, which increases the efficiency of the power system 100 but limits voltage control. In some examples, any power failure or disruption, or a voltage detected outside of a predetermined voltage range, causes the power system 100 to disengage the bypass switch 118 and resume the dual conversion of the power flow from the primary power source 102.

The fuel cell 104 consists of a polymer electrolyte membrane (PEM) fuel cell that uses gaseous hydrogen $H_2$ and oxygen $O_2$ as fuel. The individual parts and components of the PEM fuel cell 104 are not shown in the example so as not to obscure the other components of the power system 100; however, it is understood that any known fuel cell features and technologies may be included in fuel cell 104. For instance, in some cases the fuel cell 104 includes a membrane electrode assembly, along with gaskets and/or bipolar plates to incorporate the membrane electrode assembly as a stack into the fuel cell 104. Although the fuel cell 104 in this example is described as a PEM fuel cell, other known types of fuel cell are used in other examples, including Alkaline fuel cells, phosphoric acid fuel cells, molten carbonate fuel cells, and/or solid oxide fuel cells.

The energy storage device 106 includes any energy storage device (or combination of energy storage devices) with an electrical output. In some examples, the energy storage device 106 includes a battery system with one or more batteries, ultracapacitors and/or other energy storage devices including flywheel types with a converter power to DC output. In some cases, the energy storage device 106 includes a battery system with a bank of one or more lithium-ion batteries and/or lead acid batteries. As discussed in more detail below, either the fuel cell 104, the energy storage device 106, and/or a combination of the two are used to supply power to the target load in the event of an outage or disruption in the power flowing from the primary power source 102. In some examples, the fuel cell 104 and the energy storage device 106 make up a hybrid backup power source utilizes the technical advantages of the fuel cell 104, such as increased energy density, and the different technical advantages of the energy storage device 106 (e.g., battery system) such as higher power density with quicker reactions to load changes. In such examples, the fuel cell 104 provides most of the backup power for the power system 100 during an outage or disruption, and the energy storage device 106 functions as a secondary backup power source that supplies additional power to handle fluctuations. In some cases, the fuel cell 104 is also configured to recharge the energy storage device 106 as needed.

A DC/DC converter 120 is arranged (or electrically coupled) between the fuel cell 104 and the DC bus 112 in this example, while a second DC/DC converter 122 is arranged between the energy storage device 106 and the DC bus 112. In other examples, the fuel cell 104 and/or the energy storage device 106 are directly coupled to the DC bus 112. Thus, in this example each of the primary power source 102, the fuel cell 104, and the energy storage device 106 are separately and independently electrically coupled (either directly or through their separate intervening components) to the same DC bus 112. This example illustrates an integrated design of a fuel cell 106 as a backup power source within a UPS system, which provide advantages in simplifying the design and reducing the number power components in the power system 100. Additionally, the integrated design depicted in this example provides advantages in the functioning of the power system 100, by handling power transitions automatically and providing high-quality power conditioning that is required by many UPS systems.

During operation, when an outage or power disruption (e.g., a voltage fluctuation of sufficient size and/or duration) is detected within the power provided by the primary power source 102, the electrical components of the power system 100 are configured to automatically detect the outage/disruption and transition to use power from the fuel cell 104 and/or the energy storage device 106. In some examples, one or more of the AFE and AC/DC converter 110, the DC/DC converter 120, and the DC/DC converter 122 include circuitry configured to receive voltage input and output feedback data, and to adjust the voltage provided to the DC bus 112 based on the feedback. In such example, control circuitry within each of the AFE and AC/DC converter 110, the DC/DC converter 120, and the DC/DC converter 122 is configured to monitor a number of state variables, including the input voltage received at the component ($V_{in}$), the output voltage output to the to the DC bus 112 ($V_{out}$), and/or the output current ($I_{out}$). Based on these state variables, the circuitry within each of the AFE and AC/DC converter 110, the DC/DC converter 120, and the DC/DC converter 122 is configured to adjust the voltage provided to the DC bus 112.

In this example, when a power outage or disruption occurs at the primary power source 102, both the DC/DC converter 120 and/or the DC/DC converter 122 detects the outage or disruption based on the changes in its own power consumption (e.g., using the $V_{out}$ and $I_{out}$ feedback signals). In response, DC/DC converter 120 and/or the DC/DC converter 122 immediately increase their power output to automatically handle the transition to the backup power source (s). In some cases, the design of the fuel cell 104 makes it unable to immediately provide full power output, and instead it ramps up from a dormant state to full power over a period of time. In such cases, the energy storage device 106 compensates for the ramp-up period of the fuel cell 104 by immediately providing more of the backup power, and then scaling back the power provided as the power output of the fuel cell 104 ramps up. Specifically, the DC/DC converter 122 associated with the energy storage device 106 detects, based on its $V_{out}$ and $I_{out}$ feedback signals, both that the primary power source 102 has sustained an outage/disruption, and that the fuel cell 104 is not yet provided full backup power. In response, the DC/DC converter 122 is configured to initially apply a larger portion (or all) of the backup power needed to drive the target load(s) following the outage/disruption, and then to reduce the power output (e.g., battery output) over a transition period as the fuel cell 104 ramps-up to full power. In this example, the power system 100 also includes an additional DC/AC inverter 124 configured to provide power from the energy storage device 106 back to the fuel cell 104.

Similarly, when the power is restored at the primary power source 102, the DC/DC converter 120 and/or the DC/DC converter 122 automatically detect the restoration based on voltage and current feedback signals, and handle the power transition from the backup power sources, the fuel cell 104 and energy storage device 106, to the primary power source 102. As with power transitions caused by power outages, the power transitions following the restoration of the primary power source 102 are performed gradually in some cases, as the fuel cell 104 power output ramps down and the primary power source 102 power output ramps up at a corresponding rate.

As these examples illustrate, power system 100 provides capabilities for handling power transitions in the event of power outages/disruptions and subsequent power restorations at the primary power source 102. These power transitions are performed instantaneously during the operation of the power system 100, and are handled automatically, without any centralized control system, based on the arrangement and individual configuration of the power electronics. In this example, the power transitions of the power system 100 are managed by the independent operation of the AFE and AC/DC converter 110, the DC/DC converter 120, and the DC/DC converter 122, without any direct connections or communication between these components, and without any data connections at all in the power system 100 (e.g., power connections only). Additionally, although the above examples relate to managing power transitions in response to changes in the power from the primary power source 102, similar or identical techniques are used by the AFE and AC/DC converter 110, the DC/DC converter 120, and the DC/DC converter 122 to manage transitions based on changes (e.g., errors or outages) occurring at the fuel cell 104 or energy storage device 106.

As noted above, in some examples a control system is used for controlling voltage of some or all of the inverter devices and/or converter device within the power system 100. Due to the use of common DC bus 112, power control is implemented among the separate devices coupled to the DC bus 112, to maintain the DC bus 112, generally using droop-based controls. In some cases, the energy storage device 106 (e.g., battery system) DC/DC converter 122 is bidirectional in that it is capable of absorbing power from or providing power to the energy storage device 106. Fuel cell 104, in some instances, is unidirectional so that the output power from the fuel cell 104 is increased and/or reduced but never falls below zero. As described below, the active front end of the AFE and AC/DC converter 110 for the primary power source 102 (e.g., a utility grid) provides power to the DC bus 112, but also has bidirectional capability to absorb or export power to the grid. The converters and inverters within the power system 100 are configured to maintain the DC bus 112 in a stable manner. For instance, in some examples one or more of the AFE and AC/DC converter 110, the DC/DC converter 120, and the DC/DC converter 120 include lower-level inverter controls feeding into the DC bus 112 to keep the DC bus 112 stable.

The DC/AC inverter 114 from which power is provided to the target load is configured to provide clean AC power with minimal distortion. The active front end controls within the AFE and AC/DC converter 110 are used in some cases to provide reactive power and/or power factor corrections. Additionally, in some cases there is a separate connection from the primary power source 102 to the target load, via a static bypass switch 118 that is automatically activated to provide power to the target load via bypass path in case of the inverter failures along the primary path.

Figure 2:
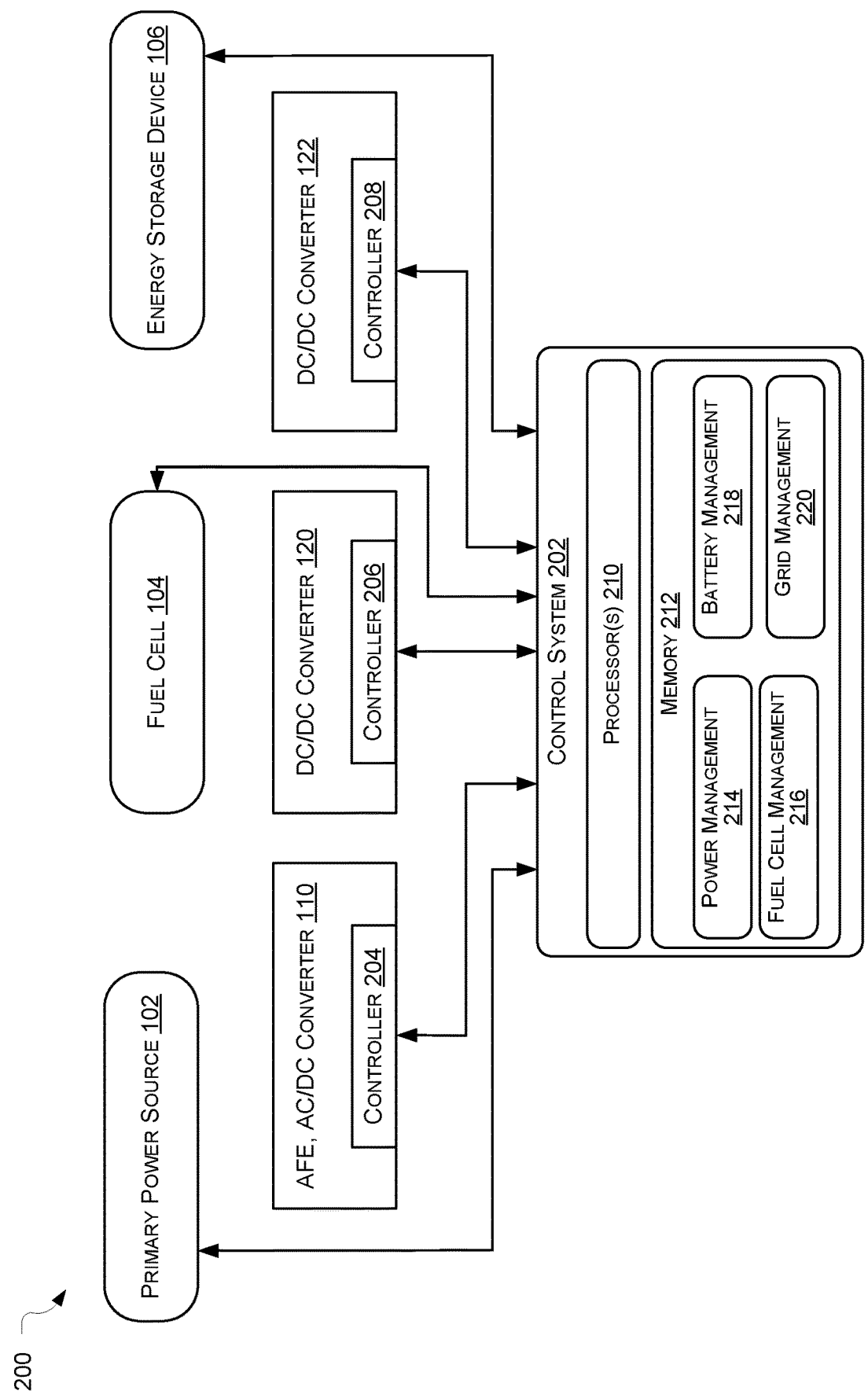
FIG. 2 illustrates an example control system associated with a UPS, including data connections associated with the primary power source and integrated fuel cell and energy storage device backup power sources, in accordance with one or more examples of the present disclosure.

FIG. 2 depicts a computing environment 200 including a control system 202 associated with the power system 100. As discussed above in reference to FIG. 1, the UPS systems described herein, such as power system 100, need not include a control system 202, and instead may operate based on the functioning of the individual electrical components and the power connections between the electrically coupled components. FIG. 2, in contrast, depicts an implementation of power system 100 including a control system 202 with data connections to various components of the power system 100. As described below, the control system 202 receives and analysis data from various components of the power system 100, and executes software-based functionality to perform power condition and management for the power system, including power sharing, transition management, power exporting back to the public electrical grid, and managing boil-off losses at the fuel cell.

In this example, the control system 202 is connected to the primary power source 102, the fuel cell 104, and the energy storage device 106. The control system 202 is also connected to individual controllers 204-208 within the AFE and AC/DC converter 110, the DC/DC converter 120, and the DC/DC converter 122, respectively. In certain implementations, the arrows in FIG. 2 correspond to data connections between the components of the power system 100, while the arrows in FIG. 1 correspond to power connections between the components. Additionally, although FIG. 2 shows six data connections of the control system 202, in various other examples the control system 202 can include data connections to any component or combination of components of the power system 100 or other UPS systems described herein. Further, the control system 202 in this example is depicted as a local control system physically installed within the power system 100 with short-range wired connections to the power system components. However, in other examples the control system 202 is implemented as a remote computing system (e.g., computer server or service), and the data transmissions between the control system 202 and the power system components are performed over one or more communication networks (e.g., the Internet, WLAN networks, cellular networks, satellite-based network, etc.).

As shown in FIG. 2, the control system 202 includes one or more processor(s) 210 and memory 212 communicatively coupled with the processor(s) 210. In the illustrated example, the memory 212 and processors 210 of the control system 202 store and execute a power management component 214, a fuel cell management component 216, a battery management component 218, and a grid management component 220, each of which is discussed in more detail below. In various implementations, the control system 202 is implemented on one or more servers or other computing devices, each of which includes the one or more processors 210 and memory 212 storing computer executable instructions capable of executing components 214-220 and/or implementing the various additional functionality of the control system 202 described herein. In some examples, the control system 202 also includes network interfaces and components (not shown) to support communication with one or more client systems and/or various other external systems or data sources. For instance, the control system 202 includes user interface components in some cases, configured to provide power system monitoring, control, and configuration functionality to users via local or remote client systems.

In various examples, the data transmissions between the control system 202 and various components of the power system 100 are performed over communication network(s), including Wi-Fi-based communication networks such as via frequencies defined by the IEEE 802.11 standards, short range wireless frequencies such as BLUETOOTH®, other radio transmission, or any suitable wired or wireless communications protocol that enables the respective power system components to interface with the control system 202.

The processor(s) 210 of the control system 202 include any suitable processor capable of executing instructions to receive data, process data, and perform operations as described herein. By way of example and not limitation, the processor(s) 210 comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices are considered processors in so far as they are configured to implement encoded instructions.

Memory 212 includes one or more memory devices including non-transitory computer-readable media. Memory 212 stores an operating system and/or one or more software applications, instructions, programs, and/or data to implement the methods and techniques described herein, and perform the various functions attributed to those systems. Memory 212 is implemented in various examples using any suitable memory technology, such as static random-access memory (SRAM), synchronous dynamic RAM (SDRAM), nonvolatile/flash-type memory, or any other type of memory capable of storing information. The architectures, systems, and individual elements described herein include many other logical, programmatic, and physical components, of which those shown in the accompanying figures are merely examples that are related to the discussion herein.

Components 214-220 are depicted in this example as different components, implemented as separate software-based modules or services, each programmed or configured to perform various the operations described herein. In other examples, particular operations or functionality described in reference to one component are performed by other components and/or by a combination of components working in collaboration. In some instances, some or all of the functionality described below in connection with components 214-220 are performed by software applications or services operating at remote cloud-based server or datacenter separate from the local power system 100.

For instance, certain operations performed by components 214-220 include determinations and/or predictions relating to power conditioning, power sharing, power management, and configuring the power sources 102-106 of the power system 100. In various implementations, components 214-220 execute rule-based heuristics and/or trained machine-learned models and machine learning algorithms to perform such determinations and predictions. In some examples, machine-learning algorithms and trained models are used to predict the upcoming power draw (or load) from the target load, the peak power times/usages at the target load and/or within the public electrical grid, upcoming outages or disruptions of the primary power source 102, the rate of the power ramp-up or ramp-down processes of the fuel cell 104, the price fluctuations of power received from or exported back to the public electrical grid, and so on. In some examples, the control system 202 includes algorithms (e.g., controlling the sequences of operations) for performing operations such as power sharing, boil off management, peak shaving between utility grid and fuel cell are rule-based, and/or involve real-time optimization (e.g., using techniques such as mixed integer linear programming, model predictive control, particle swarm optimization, etc.) based on load, utility prices including information about day ahead prices, and/or involving learning schemes for load forecasting as well as price projections. In some instances, learning schemes/techniques involve, for example, machine learning for load forecasting.

The power management component 214 is configured to perform power conditioning and/or power management tasks within the power system 100. In some examples, the power management component 214 performs power conditioning by receiving data signals from the AFE and AC/DC converter 110, the DC/DC converter 120, and the DC/DC converter 122. The power management component 214 monitors the data signals to evaluate the voltage level delivered to the target load and/or various other power quality metrics (e.g., voltage or waveform fluctuations, etc.). Additionally or alternatively, the power management component 214 receives data from the electrical components downstream of the DC bus 112, such as the DC/AC inverter 114. Based on the received data, the power management component 214 determines the quality of the electricity provided to the target load with respect to the quality metrics above, and determines control instructions for the AFE and AC/DC converter 110, the DC/DC converter 120, and the DC/DC converter 122, to improve/optimize the power quality delivered by the power system 100 to the target load.

In addition to power conditioning, the power management component 214 also performs various advanced power management functions for the power system 100. As described in more detail below, the power management component 214 receives data from various electrical components of the power system 100 (and/or additional external systems), and analyzes the data in order to detect and manage power transitions in response to power outages and disruptions, implement power sharing between the power sources based on the current and predicted states of the power sources and target load(s), determine instances to export power from the backup power sources back to the electrical grid, etc. The power management component 214 completes the power management functionality in these examples by determining control instructions for the AFE and AC/DC converter 110, the DC/DC converter 120, and the DC/DC converter 122, and transmitting the control instructions to the respective controllers 204-208.

The fuel cell management component 216 monitors and controls the operation of the fuel cell 104. In some examples, the fuel cell management component 216 receives status and operational data from the fuel cell 104, such as the current operational status and power output, the amount of chemicals in the fuel cell 104, and the current pressure, temperature, quality and flow of the various chemicals and other substances (e.g., Hz, water, nitrogen, air, water, etc.) within the fuel cell 104. In some cases, the fuel cell 104 also transmits to the fuel cell management component 216 various operational data, such as the current operational status settings for current/requested power output, current/requested power factor, previous stop/start commands, and any faults or errors occurring at the fuel cell 104, etc. Additionally or alternatively, the fuel cell management component 216 receives and uses data from the controllers 204-208, additional power sources 102 and 106, and/or any other components within the power system 100. Based on the data received from the fuel cell 104 and other data sources, the fuel cell management component 216 determines and transmits operational commands to the fuel cell 104. Such operational commands include commands to take the fuel cell 104 online or offline, to adjust the power output or power factor of the fuel cell 104, to initiate a chemical boil-off, to update the characteristics of the chemical storage and use (e.g., quality, pressure, temperature, flow) to affect or optimize the chemical reactions occurring at the fuel cell 104. The fuel cell management component 216 then transmits the operational commands to the fuel cell 104 for execution by a separate controller of the fuel cell 104.

The battery management component 218 monitors and controls the operation of the energy storage device 106. In various examples, the battery management component 218 receives status and operational data from the energy storage device 106 (e.g., current power output current charge state, battery age, temperature, faults and errors, etc.), and/or data from the controllers 204-208, additional power sources 102 and 104, and/or any other components within the power system 100. Based on the data received from the energy storage device 106 and other data sources, the battery management component 218 determines and transmits operational commands to the energy storage device 106. Such operational commands include commands to take the energy storage device 106 online or offline, to adjust the power output or other operational settings of the energy storage device 106, to address errors or faults, to call for maintenance of the energy storage device 106, etc. The battery management component 218 then transmits the operational commands to the energy storage device 106 for execution by a separate controller of the energy storage device 106.

The grid management component 220 monitors and controls the operation of the primary power source 102 in instances when the primary power source 102 is an electrical grid (e.g., a public utility electrical grid). In various examples, the grid management component 220 receives data from a control system associated with the electrical grid, including data such as the grid's operational status, current power output and availability from the grid, errors and faults, peak power usage data, sellback electricity price rates, etc. The grid management component 220 also receives data from the controllers 204-208, additional power sources 104 and 106, and/or any other components within the power system 100. Based on the data received from the primary power source 102 and other data sources, the grid management component 220 determines and transmits operational commands to the controller 204 and/or to a separate controller associated with the primary power source 102. Such operational commands include commands to engage or disengage the static bypass switch 118, to export power from the fuel cell 104 or energy storage device 106 back to the electrical grid of the primary power source 102, etc. The grid management component 220 then transmits the operational commands to the controller 204 and/or to a separate controller associated with the primary power source 102.

Although the example shown in FIG. 2 depicts three separate power sources 102-106, in other examples the power system 100 includes fewer power sources (e.g., one primary power source and one backup power source) or more power sources (e.g., multiple primary power sources and/or two or more backup power sources). Additionally, different types of power sources are used in other examples. In some instances, a primary or backup power source including photovoltaic (PV) panels is included in the power system 100. In such cases, the PV panels are electrically coupled to an additional DC/DC power converter, which is electrically coupled to the DC bus 112. Additionally or alternatively, a diesel, gas, or propane generator set is included in the power system 100, in which case the generator set is electrically coupled to an additional DC/DC power converter, which is electrically coupled to the DC bus 112. In these additional examples, the same and/or similar techniques described herein are used for managing power transitions, power sharing, power conditioning, power exporting, and the like, including the power transitions and power managements techniques described above that are handled automatically (without a control system) based on the arrangement and configuration of the individual electronic components, and techniques performed using a control system 202.

Figure 3:
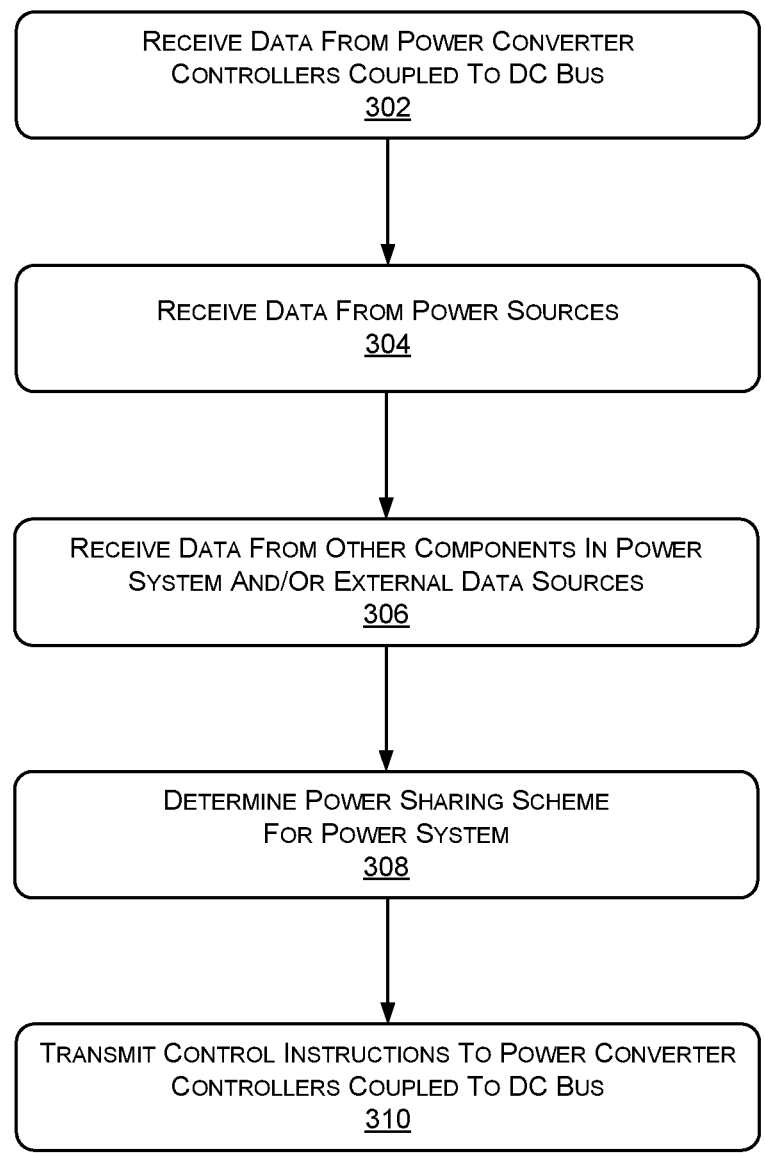
FIG. 3 is a flowchart depicting an example process of managing power sharing in a power system including multiple power sources, in accordance with one or more examples of the present disclosure.
Figure 4:
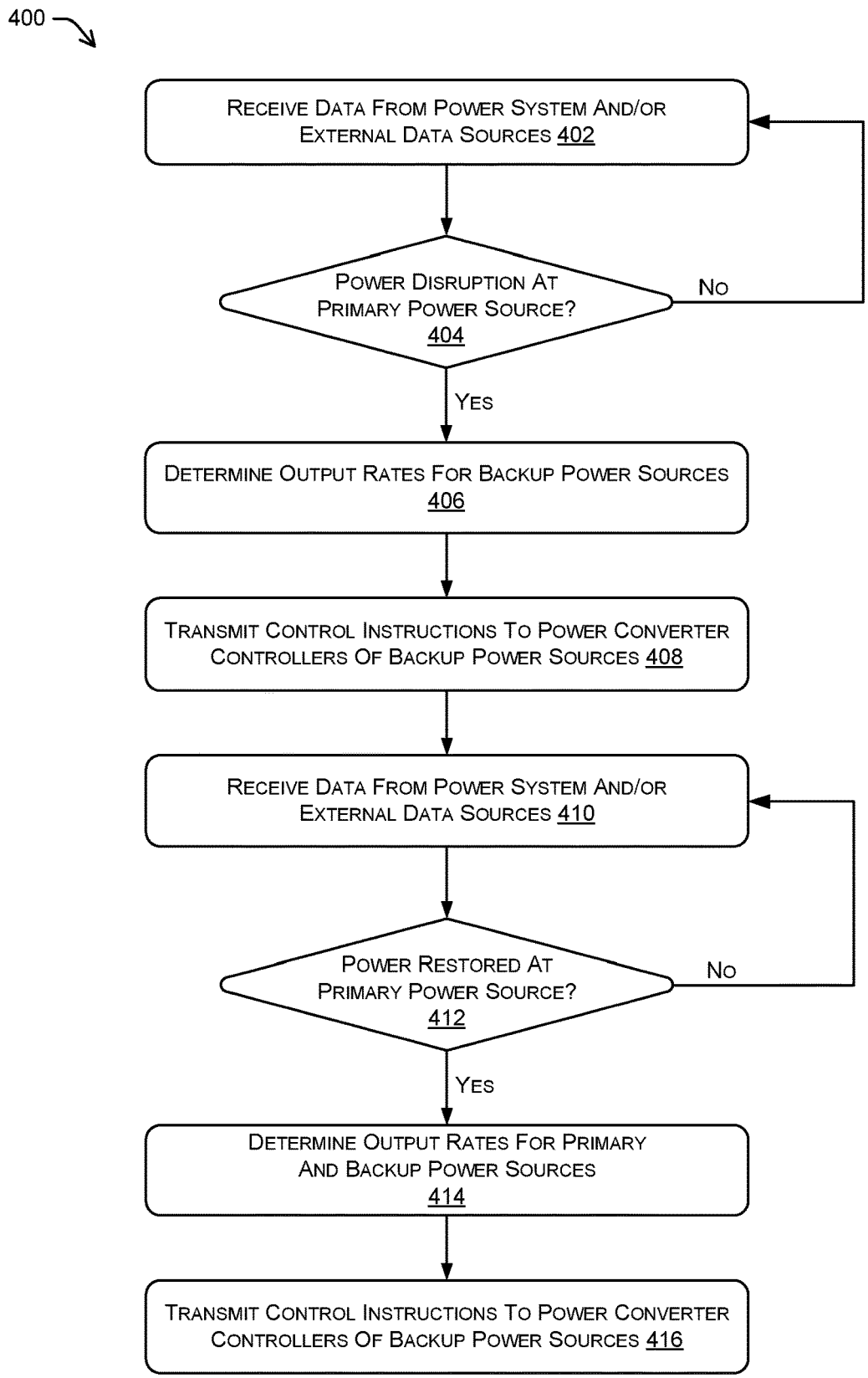
FIG. 4 is a flowchart depicting an example process of managing detecting power disruptions and performing power transitions in a power system including a primary power source and backup power source(s), in accordance with one or more examples of the present disclosure.
Figure 5:
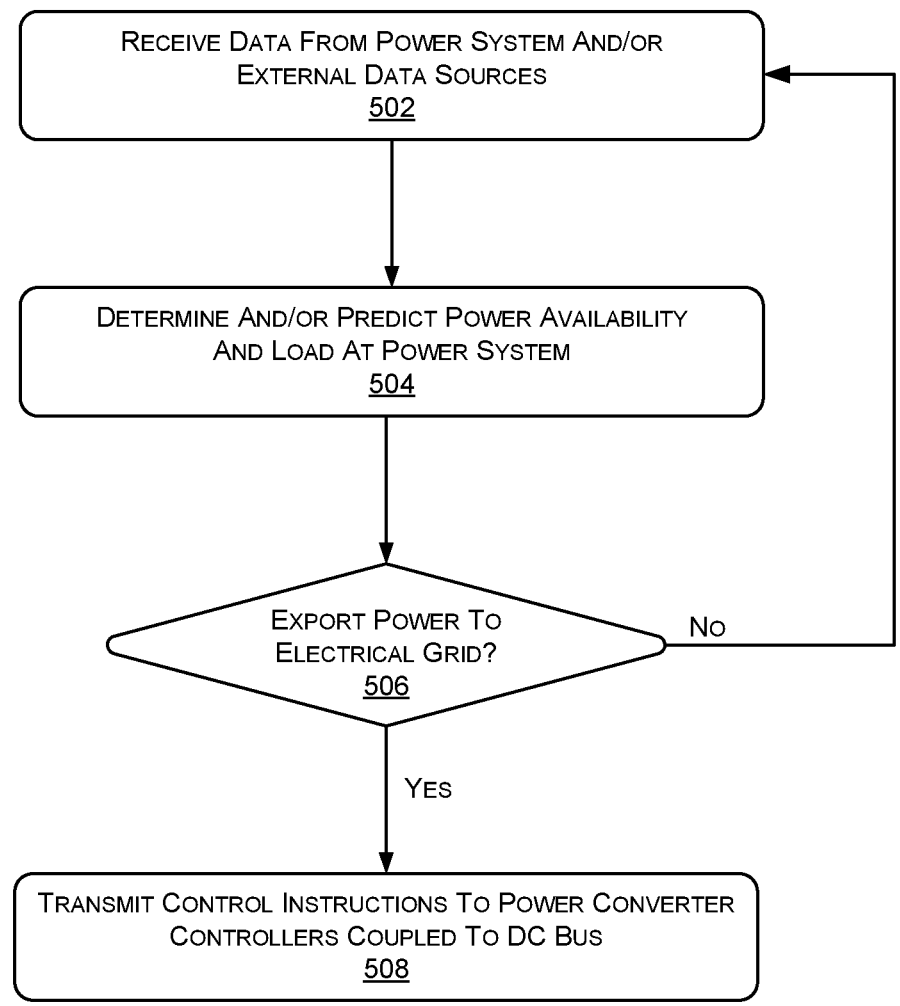
FIG. 5 is a flowchart depicting an example process of monitoring a power system including a primary power source and backup power source(s), and exporting power to an electrical grid, in accordance with one or more examples of the present disclosure.

FIGS. 3-5 are flowcharts depicting example power management processes executed for and/or within a power system 100. Specifically, FIG. 3 depicts an example power sharing process 300 in which the control system 202 monitors the power sources 102-106 and determines which power source(s) are to provide power to the target load. FIG. 4 depicts an example transition management process 400 in which the control system 202 detects a power disruption at the primary power source 102 and determines which backup power sources 104-106 are to provide power to the target load in what proportion during the transition to backup power. Additionally, FIG. 5 depicts an example power exportation process 500 in which the control system 202 monitors the power system 100 and power sources 102-106, and determines when power is to be exported from the fuel cell 104 or other backup power source(s) to an electrical grid of the primary power source 102. As described below, each of the processes 300, 400, and 500 are performed as power management operations of a control system 202 within the power system 100. In these examples, processes 300, 400, and 500 are performed by the power management component 214, alone or in combination with any of the additional power system components, power sources, and/or external systems described above in FIGS. 1 and 2. Additionally, processes 300, 400, and 500 represent three different examples of the power management processes executed by the control system 202. However, similar or identical techniques (e.g., monitoring signals from power sources 102-106 and converter controllers 204-208, determining or predicting power usage, behavior, or anomalies using heuristics or machine learning techniques, and controlling the power sources 102-106 or associated components with control signals, etc.), are used in other examples to perform any of the additional power management techniques, power conditioning techniques, and power source management techniques described herein.

FIG. 3 is a flowchart depicting a process 300 of managing power sharing in a power system 100 including a multiple power sources. As described in this example, the control system 202 associated with the power system 100 receives data from and monitors the power sources 102-106, the additional power electronics of the power system 100, and/or external data sources to implement a power sharing scheme among the power sources 102-106 to provide power to the target load. The control system 202 analyzes the various data to perform a holistic power management analysis and implement the power sharing scheme based on calculations and/or predictions relating to the system load, power status and availability of the power sources, and the like.

At operation 302, the control system 202 receives operational data from the power converters associated with each of the power sources 102-106 in the power system 100. In this example, the control system 202 receives power data from the respective controllers 204-208 of the AFE and AC/DC converter 110, the DC/DC converter 120, and the DC/DC converter 122. In some instances, the control system 202 receives data signals identifying the $V_{in}$, $V_{out}$, and/or $I_{out}$ from each of the controllers 204-208, indicating the amount, availability, quality, and/or consistency of the power provided from its associated power source 102-106 to the DC bus 112 and on to the target load.

At operation 304, the control system 202 receives operational and status data from the power sources 102-106. In contrast to the data received at operation 302 representing the power currently being provided by the primary power source 102 to the target load, the data received from the power sources 102-106 at operation 304 includes the current operational status of the power sources 102-106 and related systems, power quality data, peak power amounts and power availability, and errors and faults, power amounts remaining at each power source 102-106. In some instances, the control system 202 receives the amount of chemical fuel remaining at the fuel cell 104, or the amount of charge or remaining battery life of the energy storage device 106. Additionally, in some cases the control system 202 receives the current grid price(s) (e.g., standard, peak and off-peak prices, etc.) when the primary power source 102 includes a public utility electrical grid. In some examples, the control system 202 also receives data identifying any current or potential errors, maintenance issues, or scheduled disruptions/outages associated with any of the power sources 102-106.

At operation 306, the control system 202 receives additional data from one or more other components within the power system 100 and/or various external data sources. In some cases, the control system 202 receives current load/electrical draw data from the electrical components downstream of the DC bus 112 (e.g., the DC/AC inverter 114) and/or from target load equipment itself. In other examples, the control system 202 receives various data indicating current and/or predicted future power availability data, power price data, load data, outage/disruption data, etc.

At operation 308, the control system 202 determines a power sharing scheme for the power system 100, based on the various data received at operations 302-306. In various examples, the power sharing scheme determined in operation 308 refers to the power amounts (e.g., voltage levels) and/or percentages of the overall load provided by each of the available power sources 102-106. For instance, in a first example the control system 202 determines that 100% of the power is to be provided by the primary power source 102, while in a second example the control system 202 determines that 80% of the power is to be provided by the primary power source 102 and 20% is to be provided by the fuel cell 104, and so on. In various examples, the control system 202 determines power sharing schemes to be implemented immediately within the power system, or schemes to be implemented at a future time and/or schemes for transitioning power from one power source to another over a period of time.

In various examples, the control system 202 uses a combination of heuristics and/or trained machine learning models to determine the power sharing scheme in operation 308. In such examples, the control system 202 determines the power sharing scheme based on factors included the current power quality and availability from each of the power sources 102-106, the current grid power prices associated with the primary power source 102, the current status of the fuel cell 104 and any predicted boil-off losses, the current and predict loads required by the target load(s), the amount of chemical fuel remaining in the fuel cell 104 and current charge in the energy storage device 106, and/or any predicted power outages or disruptions from any of the power sources 102-106.

In an example, to perform power sharing when using the fuel cell 104 as a secondary power source, the control system 202 compares the load versus the utility power rates, and takes into account any need for boil-off for the fuel cell 104, to determine the distribution of power. If the current utility power rates are less than or equal to a predetermined rate threshold, the control system 202 selects the utility power from the primary power source 102 to provide the load. In this example, if the current utility power rates are greater than the predetermined rate threshold, or if a boil-off need/schedule of the fuel cell 104 dictates use of fuel cell 104, the control system 202 draws some or all of the power for the load from the fuel cell 104. The control system 202 also may determine a possible export of power from the fuel cell 104 back to the utility grid of the primary power source 102, for example, based on the load being below a threshold, the current utility power rates being above a threshold, a fuel cell boil-off determination, and/or any combination of these factors.

At operation 310, the control system 202 generates and transmits control instructions to implement the power sharing scheme determined in operation 308. In some examples, the control system 202 transmits instructions to each of the controllers 204-208 to respectively configure the AFE and AC/DC converter 110, the DC/DC converter 120, and the DC/DC converter 122 to provide the determined amount or percentage of power to the target load(s). In some instances, the control instructions transmitted at operation 310 instruct the recipient converter to set its output voltage (e.g., DC link voltage) at a fixed level and/or at a relative level with respect to the other converters coupled to the DC bus 112. Upon receiving the control instructions, the controllers 204-208 respectively configure the AFE and AC/DC converter 110, the DC/DC converter 120, and the DC/DC converter 122, to operate in accordance with the output voltage parameters and/or control parameters in the instructions.

FIG. 4 is a flowchart depicting a process 400 of detecting power outages and other disruptions, and managing transitions to backup power in a power system 100 including a multiple power sources. As described in this example, the control system 202 associated with the power system 100 receives data from and monitors the power sources 102-106 to detect power disruptions such as outages, surges, spikes, noise, power quality fluctuations, and the like, as well as power restorations following such disruptions. The control system 202 then uses data from various components of the power system 100 (and/or external data sources) to determine transitions to and from to backup power sources based on calculations and/or predictions relating to the system load, power status and availability of the power sources, and the like.

At operation 402, the control system 202 receives data from various components of the power system 100 and/or external data sources. In some examples, operation 402 is similar or identical to operations 302-306 discussed above, and includes receiving data from any of power sources 102-106, power converter controllers 204-208, and/or any other components within the power system 100 or external systems.

At operation 404, the control system 202 detects a disruption at the primary power source 102. Disruptions detected at operation 404 include power outages of the primary power source 102, such as outages of the public utility electrical grid. Such outages are detected by the control system 202 based on the data signals received from the AFE and AC/DC converter 110 (e.g., the current $V_{in}$, $V_{out}$, and/or $I_{out}$ or changes in these parameters), or data received from the primary power source 102 itself. In some cases, the control system 202 also infers outages based on data signals from the other power converters 206-208 and/or other components in the power system 100. Additionally or alternatively, the disruptions detected at operation 404 include changes in power quality, temporary power surges or spikes, voltage fluctuations, noise, and the like, associated with the primary power source 102. In various examples, the control system 202 receives periodic data signals from the controllers 204-208 and other electronic components, and uses the data signals to detect changes in the characteristics of the power provided by the primary power source 102. In these examples, power disruptions are determined by comparing the power characteristics and/or changes in the power characteristics to predetermined thresholds within the control system 202.

In this example, when the control system 202 does not detect a current disruption in the power provided by the primary power source 102 (404:No), the process returns to operation 402 and the control system 202 receives additional data for periodic or continuous monitoring of the power system 100. In contrast, when the control system 202 detects a current power disruption at the primary power source 102 (404:Yes), the control system 202 determines power output rates for the backup power sources 104 and 106 at operation 406. In some cases, fuel cell 104 requires a period of time to ramp up to a state of full power output, during which the energy storage device 106 is relied on more heavily as a backup power source. In such examples, the control system 202 determines a power transition in operation 406, during which the energy storage device 106 initially provides a greater percentage of the backup power and then scales back its power output as the capacity of the fuel cell 104 ramps up. As noted above, in various cases the control system 202 uses heuristics and/or trained machine learned models to determine the power transition strategy in operation 406, from the which the power output rates are determined for the fuel cell 104 and energy storage device 106 backup power sources. In various examples, the control system 202 determines the output rates for the power transition in operation 406, based on one or any combination of input data received at operation 402, such as the charged status and efficiency of the backup power sources 104 and 106, the amount of chemical fuel remaining in the fuel cell 104, the current and predicted capacity and/or power quality of the backup power sources 104 and 106, the current and predicted load of the target load(s), and/or the predicted length of the outage or other disruption to the primary power source 102. Thus, in various examples when the fuel cell 104 is a backup power source, the control system manages the transition from the energy storage device 106 (e.g., battery system) to the fuel cell 104 during a power loss, and manages charging of the energy storage device 106, both when the primary power source 102 is active and as need during backup operations.

At operation 408, the control system 202 generates and transmits control instructions to manage the power transition using the power output rates determined in operation 406. In some examples, the control system 202 transmits instructions to each of the controllers 204-208 to respectively configure the AFE and AC/DC converter 110, the DC/DC converter 120, and the DC/DC converter 122 to provide the determined amount or percentage of power to the target load(s) over time to manage the power transition from primary to backup power sources.

At operation 410, the control system 202 continues to receive data from various components of the power system 100 and/or external data sources. Operation 410 is similar or identical to operation 402 in this example, during which the control system 202 periodically or continuously receives status and operational data from the power sources 102-106, power converter controllers 204-208, and/or any other components within the power system 100 or external systems. The data received in operation 410 is used during or after the transition to backup power, for example, to monitor and dynamically manage the power transition and/or to detect when the power disruption of the primary power source 102 has ended.

At operation 412, the control system 202 detects a restoration of the power provided by the primary power source 102. In some cases, detecting the restoration of power includes similar and/or inverse techniques to the detection of the power disruption in operation 404. As an example, the detection of a restoration following a power outage is detected by the control system 202 based on the data signals received from the AFE and AC/DC converter 110 and/or data received from the primary power source 102 itself. In other examples, restorations following power disruptions based on changes in power quality, power surges or spikes, voltage fluctuations, noise, and the like, are determined by the control system 202 by monitoring and measuring the power characteristics and/or changes in the power characteristics from the primary power source 102.

When the control system 202 does not detect a restoration in the power provided by the primary power source 102 (412:No), the process returns to operation 410 and the control system 202 receives additional data for periodic or continuous monitoring of the power system 100. In contrast, when the control system 202 detects that the provide primary power source has been restored (412:Yes), then at operation 414 the control system 202 determines updated power output rates for both the primary power source 102 and the backup power sources 104 and 106. In some examples, the determination of updated power output rates for the power sources 102-106 uses similar or identical techniques to those discussed in reference to operation 406. In various cases the control system 202 uses heuristics and/or trained machine learned models to determine a power transition strategy back to relying on the primary power source 102, and determines the corresponding power output rates for each of the power sources 102-106 to implement the transition from backup power to primary power.

At operation 416, the control system 202 generates and transmits control instructions to manage the power transition using the updated power output rates determined in operation 414. Operation 416 uses similar or identical techniques to those discussed above in reference to operation 408. In some examples, the control system 202 transmits instructions to each of the controllers 204-208 to respectively configure the AFE and AC/DC converter 110, the DC/DC converter 120, and the DC/DC converter 122 to provide the determined amount or percentage of power to the target load(s) over time to manage the power transition from the backup power sources 104-106 to reliance partially or fully on the primary power source 102.

FIG. 5 is a flowchart depicting a process 500 of exporting power from the power system 100 to an electrical grid, such as public utility electrical grid associated with the primary power source 102. As described in this example, the control system 202 receives and analyzes data from various components of the power system 100 (and/or external data sources) to determine times to export power from the fuel cell 104 back to the electrical grid of the primary power source 102. As noted above, in some examples the fuel cell 104 incurs boil-off losses is the fuel cell is not used often enough or to provide a sufficient amount of power. To avoid the boil-off losses at the fuel cell 104, and to offset the utility costs of the power obtained from the electrical grid, the control system 202 in this example determines and implements a power exportation operation during which power is re-routed through the power system 100 back to the electrical grid of the primary power source 102.

At operation 502, the control system 202 receives data from various components of the power system 100 and/or external data sources. In some examples, operation 502 is similar or identical to operations 302-306 discussed above, and includes receiving data from any of power sources 102-106, power converter controllers 204-208, and/or any other components within the power system 100 or external systems.

At operation 504, the control system 202 determines and/or predicts power availability and/or load on the power system 100, based on the data received in operation 502. In various examples, the control system 202 determines and analyzes the current power output and system status of the power sources 102-106, including the amount of chemical fuel within the fuel cell 104 and current charge state of the energy storage device 106. Additionally or alternatively, the control system 202 determines the current load on the power system 100 and/or predicts the future load on the power system 100 from the target load(s). In some examples, the control system 202 executes heuristics and/or trained machine-learned models configured to predict the future power availability from power sources 102-106 and/or to predict the future load from the target load(s), based on previous load patterns observed by the power system 100 and/or similar power systems.

At operation 506, the control system 202 determines whether or not to export power, for example, to the public utility power grid associated with the primary power source 102. In some examples, the control system 202 determines that power is to be exported when the current (and/or predicted future) power availability from the backup power sources is greater than the current (and/or predicted future) load from the target load(s) by greater than a threshold amount. Additionally or alternatively, the control system 202 uses the current and predicted future prices of the electricity obtained from and provided back to the electrical grid and different times. Further, in some cases the control system 202 also predicts boil-off losses to be incurred by the fuel cell 104 over a certain time period, if the fuel cell 104 is not activated to provide at least a certain amount of power either to the target load(s) or for exportation.

In this example, when the control system 202 determines that power is not to be exported back to the electrical grid at the current time (506:No), the process returns to operation 502 and the control system 202 receives additional data for periodic or continuous monitoring of the power system 100. In contrast, when the control system 202 determines that power is to be exported to the electrical grid (506:Yes), the control system 202 generates and transmits control instructions to implement the power exportation in operation 508. In some examples, the control system 202 transmits instructions to each of the controllers 204-208 to respectively configure the AFE and AC/DC converter 110, the DC/DC converter 120, and the DC/DC converter 122 to export power from the fuel cell 104 (and/or energy storage device 106) back to the electrical grid of the primary power source 102. For instance, the AFE and AC/DC converter 110 is configurable for both importing power from the primary power source 102 and exporting power back to the primary power source 102. In this example, the control system 202 transmits a command to the controller 204 including power characteristics (e.g., voltage level, power factor, time duration, etc.) to configure the AFE and AC/DC converter 110 to export power back to the electrical grid. For instance, the control system 202 transmits commands to the AFE and AC/DC converter 110 to provide any needed reactive power and/or power factor corrections for the utility grid of the primary power source 102. Additionally, the control system 202 transmits control instructions to one or both of the DC/DC converter 120, and the DC/DC converter 122 (and/or other components with the power system 100), to configure the fuel cell 104 and/or the energy storage device 106 to provide additional power through the DC bus 112 sufficient to satisfy the load of the target load(s) and also to provide the power for the AFE and AC/DC converter 110 to export back to the electrical grid.

INDUSTRIAL APPLICABILITY

As discussed above, the present disclosure relates to UPS systems and/or other power systems that include fuel cells and energy storage devices (e.g., battery systems) as backup power sources. As such, the various systems and techniques described herein include improvement over conventional power systems that use backup generators operating on diesel, propane, or gasoline driven combustion engines. For example, UPS systems that include fuel cell backup power sources operate quieter and have lower emissions than comparable gas or diesel generator systems. Fuel cells also provide a more reliable, longer-running backup power source than gas, diesel, or battery backup systems. Accordingly, the integration of a fuel cell backup power source into a UPS system provides key performance advantages and enhancements for UPS systems operating in critical and power-sensitive environments such as data centers and hospitals.

Additional improvements to UPS systems result from the integrated design and power connections of the UPS with the fuel cell and energy storage device backup system described herein. The integrated design of the primary power source with the fuel cell and energy storage device backup power source(s) simplifies the UPS system and reduces the number of power electronics and batteries required as compared with conventional systems. In some examples, the primary power source, fuel cell, and energy storage device are separately and independently coupled to a DC bus, thereby simplifying the UPS system and providing automatic power transitioning in response to power outages, reductions, and restorations of the primary power source.

Further, as described above, certain systems and techniques include a control system configured with data connections to the primary power source, fuel cell, and energy storage device power source. In these examples, the control system receives and analyzes data signals from the separate power sources to provide high-quality power conditioning and management for the UPS. The control system analyzes data and transmits control instructions to the various power sources, which coordinates and improves several advanced power management tasks performed by the UPS, including power sharing between the primary and backup sources, managing power transitions, exporting power back to the public grid, and managing boil-off losses at the fuel cell. In contrast to conventional UPS systems, the techniques described herein include receiving and analyzing data from the primary power source and the fuel cell and energy storage device power sources in order to perform a more holistic analysis and power management of the UPS system.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A power system, comprising:
    a primary power source arranged to provide voltage to a target load via a DC bus, the DC bus being electrically connected to the target load, and being electrically connected to the primary power source via a first connection;
    a first backup power source comprising an electrochemical fuel cell, wherein the first backup power source is arranged to provide voltage from the electrochemical fuel cell to the target load via the DC bus, the DC bus being electrically connected to the first backup power source via a second connection;
    a second backup power source comprising an energy storage device, wherein the second backup power source is arranged to provide voltage from the energy storage device to the target load via the DC bus, the DC bus being electrically connected to the second backup power source via a third connection; and
    an active front end device electrically coupled to the DC bus at the first connection, wherein the active front end device includes an AC/DC converter, the active front end device being configured to transmit power bidirectionally between the primary power source and at least one of the first and second backup power sources.

2. The power system of claim 1, wherein AC/DC converter is arranged to convert AC power from an electrical grid into DC power.

3. The power system of claim 2, wherein the first backup power source comprises a first DC to DC converter electrically coupled to the DC bus at the second connection, and wherein the second backup power source comprises a second DC to DC converter electrically coupled to the DC bus at the third connection.

4. The power system of claim 1, wherein at least one the primary power source, the first backup power source, or the second backup power source comprises a controller configured to:
    receive signals indicative of a voltage provided to the DC bus;
    detect a difference between the voltage provided to the DC bus and a reference voltage; and
    modify a power output based on the difference.

5. The power system of claim 4, wherein the controller is configured to modify a power output, without receiving a data signal via a data connection from a controller.

6. The power system of claim 1, further comprising a control system, the control system including:
    one or more central processing units (CPUs); and
    memory storing executable instructions that, when executed by the one or more CPUs, cause the control system to perform operations comprising:
        receiving, via one or more data connections, data signals from at least one of the primary power source, first backup power source, or the second backup power source; and
        transmitting control instructions, via the one or more data connections, to at least one of the primary power source, first backup power source, and the second backup power source.

7. The power system of claim 6, wherein the instructions cause the control system to perform operations further comprising:
    determining that an outage has occurred at the primary power source, based on the data signals received from at least one of the primary power source, first backup power source, or the second backup power source; and
    transmitting control instructions to at least one of the first backup power source or the second backup power source, the control instructions configured to manage a power transition from the energy storage device to the electrochemical fuel cell.

8. The power system of claim 6, wherein the instructions cause the control system to perform operations further comprising:
    determining a first portion of the power provided to target load to be provided by the primary power source, and a second portion of the power provided to target load to be provided by the electrochemical fuel cell; and transmitting control instructions to at least one of the primary power source or the first backup power source, based on the determined the first portion and determined second portion.

9. The power system of claim 6, wherein the active front end device is arranged to receive power from an electrical grid, and wherein the instructions cause the control system to perform operations further comprising:

determining an amount of power to export to the electrical grid, based on the data signals received from at least one of the primary power source, first backup power source, or the second backup power source; and transmitting control instructions to the active front end device to export the determined amount of power to the electrical grid.

10. The power system of claim 9, wherein the control system determines the amount of power to export to the electrical grid based on at least one of:

a grid power price received from the active front end device;

a power load associated with the target load; or boil-off loss data associated with the fuel cell, received from the first backup power source.

11. The power system of claim 6, wherein the instructions cause the control system to perform operations further comprising:

receiving one or more data signals associated with the target load;

determining a combined power output from the primary power source, the first backup power source, and the second backup power source, to the target load, based on the one or more data signals; and transmitting a control instruction to modify a voltage provided by at least one of the primary power source, the first backup power source, or the second backup power source, based on the combined power output to the target load.

12. A method, comprising receiving, by a control system, a first data signal from a primary power source of a power system, wherein the primary power source is arranged to provide voltage to a target load via a DC bus electrically disposed between the primary power source and the target load;

receiving, by the control system, a second data signal from a backup power source of the power system, wherein the backup power source comprises an electrochemical fuel cell, wherein the backup power source is separately coupled to the DC bus and is arranged to provide voltage from the electrochemical fuel cell to the target load via the DC bus;

determining, by the control system and based at least in part on the first data signal and the second data signal, a first output voltage associated the primary power source;

determining, by the control system and based at least in part on the first data signal and the second data signal, a second output voltage associated with the backup power source;

transmitting, by the control system, a first control instruction including data representing the first output voltage to a controller of the primary power source via a first data connection; and transmitting, by the control system, a second control instruction including data representing the second output voltage to a controller of the backup power source via a second data connection, wherein the first control instruction causes the primary power source to output the first output voltage and wherein the second control instruction causes the backup power source to output the second output voltage.

13. The method of claim 12, further comprising:

receiving a third data signal from a second backup power source of the power system, wherein the second backup power source comprises an energy storage device, wherein the second backup power source is separately coupled to the DC bus and is arranged to provide voltage from the energy storage device to the target load via the DC bus;

determining a third output voltage associated with the second backup power source to the target load, based at least in part on the third data signal; and transmitting, by the control system, a third control instruction including data representing the third output voltage to a controller of the second backup power source via a third data connection, wherein the third control instruction causes the second backup power source to output the third output voltage.

14. The method of claim 13, further comprising:

determining, based on at least one of the first data signal, second data signal, and third data signal, that an outage has occurred at the primary power source, and determining a power transition operation to manage a power transition from the energy storage device to the electrochemical fuel cell during the outage, wherein the second control instruction and the third control instruction are determined based on the power transition operation.

15. The method of claim 12, further comprising:

determining a first portion of the power provided to target load to be provided by the primary power source, and a second portion of the power provided to target load to be provided by the electrochemical fuel cell, wherein at least one of the first control instruction or the second control instruction are based at least in part on the determined the first portion and determined second portion.

16. The method of claim 12, wherein the primary power source includes an active front end device arranged to receive power from an electrical grid, and wherein the method further comprises:

determining an amount of power to export to the electrical grid, based at least in part on the first data signal and the second data signal, and wherein the first control instruction comprises an instruction to the active front end device to export the determined amount of power to the electrical grid.

17. The method of claim 16, wherein the amount of power to export to the electrical grid is determined by the control system based on at least one of:

a grid power price received from the active front end device;

a power load associated with the target load; or boil-off loss data associated with the fuel cell, received from the backup power source.

18. An uninterruptible power source (UPS) system, comprising:

a primary power source arranged to provide power to a target load, the primary power source comprising a first controller configured to control a first power output from the primary power source to the target load;

a first backup power source comprising an electrochemical fuel cell, the first backup power source comprising a second controller configured to control a second power output from the first backup power source to the target load;

a second backup power source comprising an energy storage device, the second backup power source comprising a third controller configured to control a third power output from the second backup power source to the target load; and a control system including:
    one or more central processing units (CPUs); and
    memory storing executable instructions that, when executed by the one or more CPUs, cause the control system to perform operations comprising:
        receiving, via one or more data connections, a data signal from at least one of the primary power source, the first backup power source, or the second backup power source;
        determining, based at least in part on the data signal, an output voltage associated with at least one of the primary power source, the first backup power source, or the second backup power source; and
        transmitting, via the one or more data connections, a control instruction including data representing the determined output voltage to at least one of the primary power source, the first backup power source, and the second backup power source.

19. The UPS system of claim 18, further comprising:

a DC bus electrically disposed between the primary power source, the first backup power source, the second backup power source, and the target load, such that each of the primary power source, the first backup power source, and the second backup power source are independently coupled to the DC bus.

20. The UPS system of claim 19, wherein the primary power source includes an active front end device electrically coupled to the DC bus, wherein the active front end device includes an AC/DC converter arranged to convert AC power from an electrical grid into DC power;

the first backup power source comprises a first DC to DC converter electrically coupled to the DC bus; and the second backup power source comprises a second DC to DC converter electrically coupled to the DC bus.

* * * * *